United States Patent

[11] 3,600,102

[72] Inventor Paul P. Dirlik
 4847-A South 28th St., Arlington, Va.
 22206
[21] Appl. No. 841,503
[22] Filed July 14, 1969
[45] Patented Aug. 17, 1971

[54] CONTROL ASSEMBLY FOR CONTROLLABLE PITCH PROPELLER
 8 Claims, 3 Drawing Figs.
[52] U.S. Cl. .................................................... 416/157
[51] Int. Cl. ..................................................... B63h 3/08
[50] Field of Search .......................................... 416/156,
 157; 170/160.31, 160.32, 160.53, 160.51

[56] References Cited
 UNITED STATES PATENTS
1,987,650 1/1935 Wiegand ..................... 416/156 (X)
3,056,457 10/1962 MacFarland ................. 416/157
3,232,350 1/1966 Lorenz ......................... 416/157
 FOREIGN PATENTS
 168,030 12/1954 Australia ...................... 416/157

Primary Examiner—Everette A. Powell, Jr.
Attorneys—Clarence A. O'Brien and Harvey B. Jacobson ABSTRACT: A rotatable nut and hub assembly having fluid passages therein communicating with a piston and cylinder assembly to control the pitch of propeller blades attached to the hub and a connector at the outer end of the nut connected to a supply conduit for fluid with the connector including a ball with passageways incorporated therein received in a seat having one portion thereof movably engaged with the ball and held in position by a spring device whereby the fluid will lubricate the connector and the movable seat serves to enable bleeding of air from the control system.

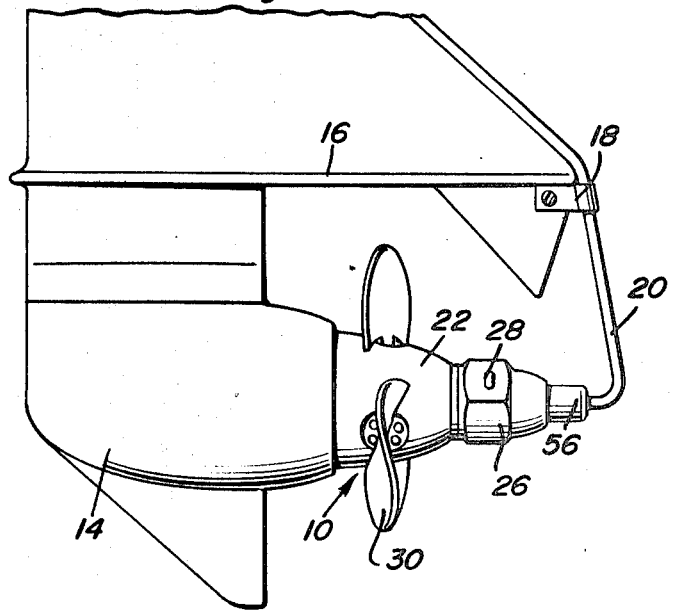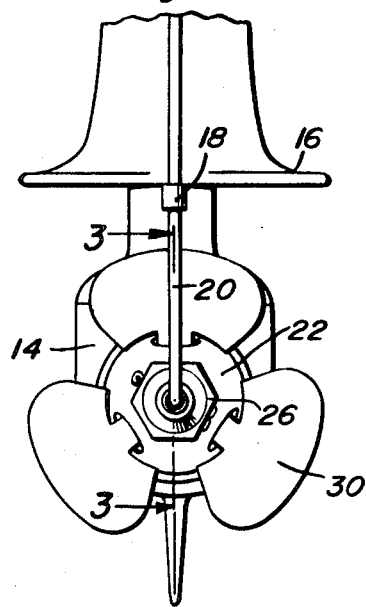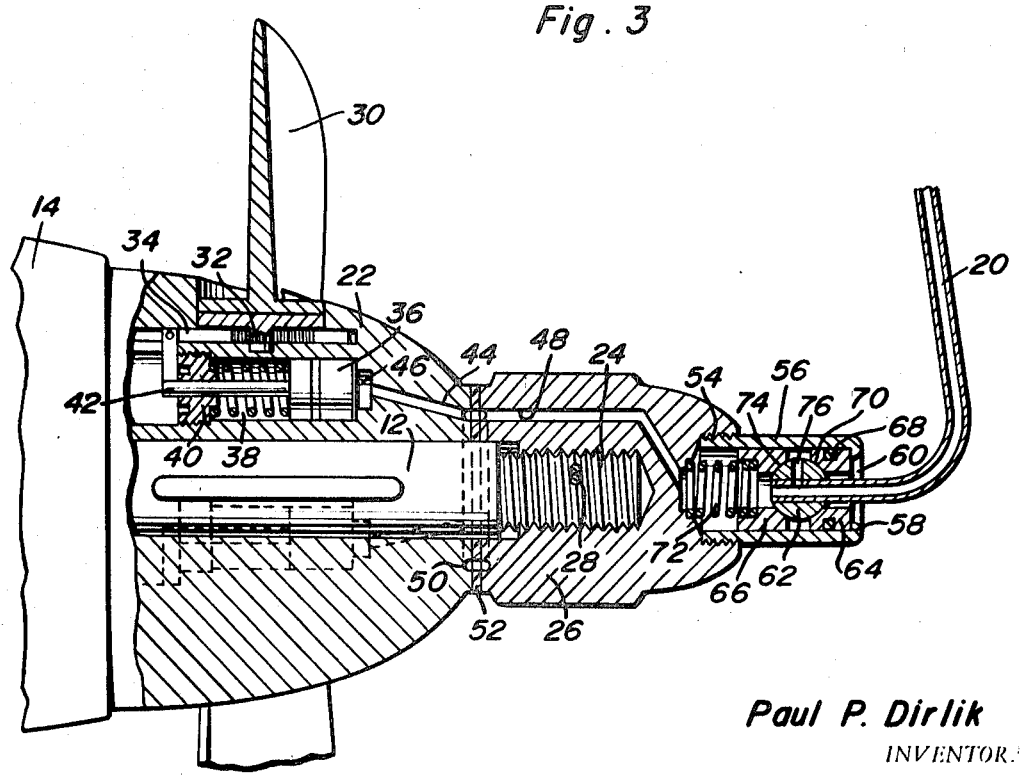
Paul P. Dirlik
INVENTOR.

3,600,102

CONTROL ASSEMBLY FOR CONTROLLABLE PITCH PROPELLER

BACKGROUND OF THE INVENTION

This invention relates to controllable pitch propellers and more particularly to a control system therefore including a connector assembly for communicating pressurized hydraulic fluid with an actuating piston and cylinder assembly for controlling the pitch of propeller blades.

The control system is connected with the retaining nut for the hub and includes a swivel connector that is constructed to be self-lubricating and capable of bleeding the control system.

Previously known patented propellers which include pivotal blades adjusted by employing hydraulic pressure through a piston and cylinder assembly operatively connected to a propeller blade in order to pivot the blade about substantially a radial axis extending from the hub to vary the pitch of the blade. Previously known devices have communicated the hydraulic pressure to the piston and cylinder assembly by the introduction of hydraulic pressure into passageways in the shaft and hub with the passageways communicating with the shaft and hub from the shaft side of the hub. In some instances, such passageways actually pass through the shaft which required a rotary sealed connection with the shaft.

SUMMARY OF THE INVENTION

An object of the present invention is to provide a control system for controllable pitch propellers in which the hydraulic fluid for controlling the pitch of a propeller blade is communicated with the propeller hub from the end of the retaining nut on the shaft for retaining the propeller hubs thereon with the retaining nut having a connector associated therewith for connecting a hydraulic fluid conduit therewith for communication with piston and cylinder assemblies for controlling the pitch of the propeller blade.

Another object of the invention is to provide a control system in accordance with the preceding object in which the connector is in the form of a cylindrical sleeve mounted on the retaining nut for the hub and including a ball seat therein receiving a ball on the end of a supply conduit with a portion of the ball seats being movable to enable bleeding of the control system and the ball received in the ball seat having a passageway communicating with the pressure for providing pressure lubricant of the ball surface and bearings therefore.

Another important object of the present invention is to provide a control system for a controllable pitch propeller which is quite simple in construction, easy to install, substantially leakproof, substantially frictionless, nonrigid in construction, permits easy bleeding of fluid as well as lubrication of the connection and eliminates the necessity of a plurality of pressure fitting connections on the propeller shaft.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of a controllable pitch propeller with the control system of the present invention incorporated thereon.

FIG. 2 is a rear elevational view of the construction of FIG. 1.

FIG. 3 is a vertical, sectional view, on an enlarged scale, taken along section line 3-3 of FIG. 2 illustrating the structural details of the invention.

DESCRIPTION OF THE PREFERRED EMBODIMENT

Referring now specifically to the drawings, the controllable pitch propeller is generally designated by numeral 10 with the propeller being mounted on a conventional propeller shaft 12 rotatably supported in a housing or strut 14 with the shaft 12 being driven in any suitably manner. It is pointed out that the shaft 12 may be supported in any suitable relation from a boat and the propeller 10 may be oriented in any suitable relation thereto with the device being illustrated with a cavitation plate 16 on an outboard motor or outboard drive unit. If the device is to be used with an inboard motor, the keel of the boat or the hull thereof would generally be in substantially the same position as the cavitation plate 16 which provides a supporting point for a clamp-type bracket 18 which supports a supply conduit 20 which extends from a supply of hydraulic fluid, a pump therefore and a control valve to enable fluid pressure to be admitted into or exhausted from the conduit 20. The specific construction of the clamp bracket 18 may vary and the conduit 20 may be in the form of the flexible hose, tubing, rigid conduit, pipe or the like which is constructed of metal and has some degree of resiliency and flexibility so that the conduit 20 will be capable of withstanding the vibration and forces exerted thereon during rotation of the propeller 10.

The propeller 10 includes a hub 22 of generally cylindrical configuration with the hub being tapered or rounded in any suitable manner and the hub is keyed or otherwise locked to the shaft for rotation therewith in any suitable manner with the shaft 12 projecting axially beyond one end of the hub and terminating in a threaded end portion 24 for threadedly receiving a hub retaining nut 26. The hub retaining nut 26 is retained in assembled position by a key such as a cotter pin 28 extending through a diametric hole in the nut 26 and the threaded end 24 of the shaft 12.

The hub 22 includes a plurality of radially extending propeller blades 30 which are supported for pivotal movement about a radial axis and which includes an axial extension 32 having gear teeth thereon for meshing engagement with a rack gear 34 that is actuated by a piston 36 received in a cylindrical cavity 38 in the hub 22. The cavity 38 is closed by a closure plug or the like 40 through which a piston rod 42 extends. The piston rod 42 is rigid with the piston 36 and is connected to the rack gear 34 to actuate the same. The particular structure of the propeller blade 30 and the hydraulically actuated piston and cylinder assemblies for controlling the pitch thereof forms no particular part of the present invention inasmuch as such structures are generally old and well-known. However, the hub 22 is provided with a passageway 44 which communicates the area of the cavity 38 outwardly of the piston 36 designated by numeral 46 with the rear surface of the hub 22 as illustrated in FIG. 3. The nut 26 is also provided with a passageway 48 extending from end to end thereof. To assure communication of the passageways 44 and 48, annular grooves 50 are provided in the opposed faces of the hub 22 and nut 26 and a sealing washer or gasket 52 is also provided therebetween with the gasket 52 having a plurality of apertures therethrough communicating the two annular grooves 50 thereby providing for communication between the passageways 44 and 48.

The end of the nut 26 remote from the hub is also rounded and tapered and provided with an internally threaded recess 54 which is in communication with the passageway 48 by virtue of the passageway 48 communicating with the inner end of the recess 54. Threadedly engaged in the recess 54 is a tubular sleeve 56 having a portion of the external surface thereof screw-threaded and in detachable engagement with the internally threaded recess 54 so that the sleeve 56 is rigidly attached to the nut 26 and forms an axial extension thereof. The end of the sleeve 56 remote from the nut 26 is provided with an inturned flange 58 which defines an opening 60 which receives the tubing 20. The tubing 20 terminates within the sleeve 56 and is provided with a spherical ball 62 on the terminal ends thereof with the tubing 20 extending diametrically through the ball and generally axially of the sleeve 56 at the center thereof. To seat the ball 62, a pair of annular bearing seats 64 and 66 are provided with the bearing seat 64 having an O-ring seal 68 in the outer periphery thereof in sealing engagement with the interior of the sleeve 56. Also, the bearing seat 64 abuts the inner surface of the flange 58 and the inner end of the bearing seat 64 includes a partially spherical bearing surface 70 in bearing engagement with the ball 62 thus defining a bearing for the ball 62 and a seal for the sleeve 56.

The bearing seat 66 is longitudinally slidable in the sleeve 56 with the exterior surface thereof engaging the interior surface of the sleeve 56. A compression coil spring 72 extends between a recess in the annular bearing seat 66 and a spring seat in the bottom of the recess 54 and the nut 26 to bias the bearing seat 66 against the ball 62 in opposed relation to the bearing seat 64. The bearing seat 66 is provided with a partially spherical bearing surface 74 to engage the spherical ball 62 as illustrated in FIG. 3. Thus, hydraulic fluid pressure may pass through the conduit 20, through the ball 62, through the annular bearing seat 66, spring 72, passageway 48, grooves 50, sealing washer 52 and passage 44 into the space 46 to cause movement of the piston 36 in a well-known manner. By exerting inward force on the conduit all the spring 72 may be slightly compressed thus moving the ball 62 away from the ball seat 70. When this occurs, fluid pressure may then exit from a passageway 76 which is formed in the ball 62 in perpendicular relation to the tubing 20. The passageway 76 communicates through the tubing 20 with the fluid pressure so that fluid pressure may exit through the passageway 76 and be discharged out through the open end 60 of the sleeve 56 thus bleeding the system of air. This passage also enables hydraulic fluid pressure to at all times be engaged with all surfaces of the ball 62 except that portion exposed to water around the entrance area of the tubing 20 so that the bearing seats 70 and 74 will be lubricated by the hydraulic fluid.

While passageways have been illustrated in the hub and hub nut, it is also within the purview of this invention to employ external conduits, tubes, pipes or the like extending from the hub nut to the hub with the connector sleeve and its related structure being employed to provide to relative rotation between the rotatable hub and hub nut and the stationary tubing 20. This structure also provides for relative angular displacement between the rotational axis of the shaft and the tubing, provides pressurized lubrication for the joint and enables bleeding thereof. The connector sleeve and its related structure is quite easily installed and its simplicity of design enables easy removal and replacement without special tools other than one normally used with a conventional propeller structure. The hose connector which provide for the nonrigid connection permits a certain latitude for shaft vibration and misalignment and at the same time produces substantially a leakproof and frictionless connection even when relatively high fluid pressures are employed. The propeller nut and pressure fluid connector allows fluid to pass from a pressure control to the propeller actuator without any modification of the propeller shaft or pressure fitting connections thereon which are normally required in conventional controllable pitch propellers. The connector structure provides for bleeding of fluid and lubrication of the ball joint at all times. The hydraulic control system may be easily bled by merely exerting inward pressure on the tubing 20 and upon release of such pressure, the ball will immediately reseat itself. Various materials may be employed in constructing the connector arrangement such as those normally employed in hub and propeller structures.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. In combination with a propeller having a hub and at least one radial blade mounted thereon for angular movement to vary the pitch of the blade, said hub including fluid pressure actuated means operatively associated with the blade and hub to control the pitch of the blade, the propeller hub being driven by a power shaft, and means retaining said propeller hub on the shaft that improvement comprising connector means operatively associated with the hub for rotation therewith and in communication with the fluid pressure means for controlling the pitch of the propeller blade, a supply conduit for pressurized fluid engaged with the connector means for relative movement to enable the supply conduit to be stationarily supported from an adjacent structure, said connector means including a tubular sleeve operatively associated with the hub and in rigid relation thereto, means operatively connecting the supply conduit and tubular sleeve to enable relative movement therebetween, said means connecting the tubular sleeve and supply conduit including ball and socket means connecting the conduit to the sleeve for universal angular movement and providing communication between the conduit and the interior of the sleeve, said ball and socket including a passageway perpendicular to the conduit and communicating therewith with the other end of the perpendicular passageway communicating with the relatively movable surfaces of the ball and socket to enable discharge of fluid pressure between the relatively movable surfaces, said conduit adapted to convey hydraulic fluid pressure having lubrication characteristics whereby relative movement between the ball and socket will be lubricated by the hydraulic fluid.

2. The structure as defined in claim 1 wherein said means retaining the hub on the shaft includes a hub nut, said sleeve being attached to said hub nut, said hub nut and hub having a passageway therethrough disposed in aligned relation and communicating the inner end of the sleeve with the fluid pressure means for permitting passage of pressurized hydraulic fluid therethrough.

3. In combination with a propeller having a plurality of radial blades attached to a hub for angular movement to vary the pitch of each blade, fluid pressure power actuated means operatively associated with said blades and hub to control the pitch of the blade, the hub of said propeller being mounted on an end portion of a power shaft, said shaft including a nut detachably screw-threaded thereon for retaining the propeller hub in place on the shaft, that improvement comprising connector means mounted on the hub nut for rotation therewith and in communication with the fluid pressure means for controlling the pitch of the propeller blade, a supply conduit for pressurized fluid engaged with the connector means for relative movement to enable the supply conduit to be stationarily supported from an adjacent stationary structure, said connector means including a tubular sleeve attached to the hub nut, and means operatively connecting the supply conduit and tubular sleeve to enable relative rotation therebetween and relative angular movement and longitudinal inward movement of the portion of the conduit disposed within the sleeve, said means connecting the tubular sleeve and conduit including a spherical ball mounted on the end of the conduit with the conduit passing therethrough, spaced annular ball seats mounted in said sleeve in engagement with opposed annular portions of the ball on the conduit, one of said annular ball seats being movably mounted in the tubular sleeve, spring means biasing the movable ball seat toward the ball for retaining the ball seat in engagement with the ball.

4. The structure as defined in claim 3 together with a passage disposed in the ball perpendicular to the conduit and communicating therewith with the outer end of the perpendicular passage communicating with the surface of the ball between the ball seat to enable discharge of fluid pressure when the ball and movable ball seat are moved longitudinally in the sleeve.

5. The structure as defined in claim 4 wherein said conduit conveys hydraulic fluid pressure having lubrication characteristics whereby relative movement between the ball and ball seats will be lubricated by the hydraulic fluid.

6. The structure as defined in claim 5 wherein said movable ball seat is disposed adjacent the hub nut, the end of the tubular sleeve remote from the hub nut having an inturned flange engaging the stationary ball seat to retain it in position and to enable longitudinal movement of the conduit and lateral pivoting thereof.

7. The structure as defined in claim 6 wherein said hub nut and hub have passageways communicating with the tubular sleeve for permitting passage of pressurized hydraulic fluid therethrough.

8. The structure as defined in claim 2 wherein said ball and socket includes a spherical ball mounted on the end of the conduit with the conduit passing therethrough, spaced annular ball seats mounted in said sleeve in engagement with opposed annular portions of the ball on the conduit, the inner of said ball seats being longitudinally movably mounted in the tubular sleeve, and spring means biasing the movable ball seat toward the ball for retaining the ball seats in engagement with the ball.